(12) United States Patent
Mangnall et al.

(10) Patent No.: US 11,328,015 B2
(45) Date of Patent: May 10, 2022

(54) FUNCTION APPROXIMATION (71) Applicant: Graphcore Limited, Bristol (GB)

(72) Inventors: Jonathan Mangnall, Portishead (GB); Stephen Felix, Bristol (GB)

(73) Assignee: Graphcore Limited, Bristol (GB)

(*) Notice: Subject to any disclaimer, the term of this patent is extended or adjusted under 35 U.S.C. 154(b) by 288 days.

(21) Appl. No.: 16/395,345

(22) Filed: Apr. 26, 2019

(65) Prior Publication Data

US 2020/0201601 A1  Jun. 25, 2020

(30) Foreign Application Priority Data

Dec. 21, 2018 (GB) ..................................... 1821069

(51) Int. Cl.
*G06F 17/17* (2006.01)
*G06F 16/901* (2019.01)
*G06F 1/03* (2006.01)

(52) U.S. Cl.
CPC ............ *G06F 16/9017* (2019.01); *G06F 1/03* (2013.01); *G06F 17/17* (2013.01)

(58) Field of Classification Search
CPC ....... G06N 3/04; G06F 7/544; G06F 16/9017; G06F 17/10; G06F 17/17; G06F 1/03; G06F 1/035; G06F 1/0356; G06F 2207/3824
See application file for complete search history.

(56) References Cited

U.S. PATENT DOCUMENTS

| | | | |
|---|---|---|---|
| 6,223,192 B1* | 4/2001 | Oberman | G06F 7/53 |
| | | | 708/270 |
| 9,811,503 B1* | 11/2017 | Pasca | G06F 17/17 |
| 2005/0160129 A1 | 7/2005 | Endo | |
| 2005/0283516 A1* | 12/2005 | Fenney | G06F 17/17 |
| | | | 708/495 |
| 2017/0004111 A1* | 1/2017 | Ng | G06F 7/00 |
| 2017/0083287 A1* | 3/2017 | Yu | G06F 7/5525 |
| 2017/0169132 A1* | 6/2017 | Hossack | G06F 16/9017 |

OTHER PUBLICATIONS

Combined Search and Examination Report for United Kingdom Patent Application No. GB1821069.0 dated Oct. 1, 2019.

* cited by examiner

*Primary Examiner* — Emily E Larocque
*Assistant Examiner* — Huy Duong
(74) *Attorney, Agent, or Firm* — Haynes and Boone, LLP (57) ABSTRACT

A function approximation system is disclosed for determining output floating point values of functions calculated using floating point numbers. Complex functions have different shapes in different subsets of their input domain, making them difficult to predict for different values of the input variable. The function approximation system comprises an execution unit configured to determine corresponding values of a given function given a floating point input to the function; a plurality of look up tables for each function type; a correction table of values which determines if corrections to the output value are required; and a table selector for finding an appropriate table for a given function.

18 Claims, 10 Drawing Sheets

| | Function Value₁ | Diff₁ |
| Mantissa₁ | Function Value₁ | Diff₁ |
| Mantissa₂ | Function Value₂ | Diff₂ |
| Mantissa₃ | Function Value₃ | Diff₃ |
| Mantissa₄ | Function Value₄ | Diff₄ |
| Mantissa₅ | Function Value₅ | Diff₅ |
| Mantissa₆ | Function Value₆ | Diff₆ |
| Mantissa₇ | Function Value₇ | Diff₇ |
| Mantissa₈ | Function Value₈ | Diff₈ |
| Exponent₁ | | |

FUNCTION APPROXIMATION

CROSS-REFERENCE TO RELATED APPLICATIONS

This application claims the priority benefit under 35 U.S.C. § 119 of United Kingdom Patent Application No. 1821069.0, filed Dec. 21, 2018, the entire contents of which are incorporated herein by reference.

TECHNICAL FIELD

The present disclosure relates to a processing unit for approximating the values of functions calculated using floating point numbers.

BACKGROUND

In computing, bit sequences of predefined sizes are used to represent numbers. The particular representation of the bit sequence determines how a bit sequence is interpreted.

One form of representation is the floating-point representation, which is often used to approximately represent real numbers. The floating-point representation comprises 3 separate components, i.e. a sign component, a mantissa component, and an exponent component. In the single-precision (i.e. 32-bit) floating point representation according to the IEEE 754 standard, the sign component consists of a single bit, the exponent consists of 8 bits, and the mantissa consists of 23 bits. In the half-precision (i.e. 16-bit) floating-point representation, the sign component consists of a single bit, the mantissa consists of 10 bits, and the exponent consists of 5 bits. In most cases, a number is given from these 3 components by the following formula:

$$(-1)^{signbit} \times 1.mantissa \times 2^{exponentbits-offset}$$

The displayed "offset" to the exponent is dependent upon the number of bits used to represent the exponent, which is dependent upon the precision level. In the single-precision representation, the offset is equal to 127. In the half-precision format, the offset is equal to 15.

Here "1" is an implicit bit, which is derived from the exponent. In the case that the exponent bit sequence consists of anything other than all zeros or all ones, the implicit bit is equal to one and the number is known as a "Norm". In this case, the floating point number is given by:

$$(-1)^{signbit} \times 1.mantissa \times 2^{exponentbits-offset}$$

In the case that the exponent bit sequence consists of all zeros, the implicit bit is equal to zero and the number is known as a "denorm". In this case, the floating point number is given by:

$$(-1)^{signbit} \times 0.mantissa \times 2^{exponentbits-offset}$$

The denorms are useful, since they allow smaller numbers to be represented than would otherwise be representable by the limited number of exponent bits.

The other circumstance—in which the exponent bit sequence consists of all ones—may be used to represent special cases, e.g. ±infinity or NaN (not a number). NaN is a numeric data type value representing an undefined or unrepresentable value. The presence of a NaN in the results of a calculation is often taken to signal an exception.

The floating point representation may be used to represent numbers in implementations of neural network processing. An implementation of neural networks involves the storage and manipulation of such floating point numbers. Neural networks are used in the field of machine learning and artificial intelligence. Neural networks comprise arrangements of sets of nodes which are interconnected by links and which interact with each other. The principles of neural networks in computing are based on information about how electrical stimuli convey information in the human brain. For this reason, the nodes are often referred to as neurons. They may also be referred to as vertices. The links are sometimes referred to as edges. The network can take input data and certain nodes perform operations on the data. The result of these operations is passed to other nodes. The output of each node is referred to as its activation or node value. Each link is associated with a weight. A weight defines the connectivity between nodes of the neural network. Many different techniques are known by which neural networks are capable of learning, which takes place by altering values of the weights.

Figure 1:
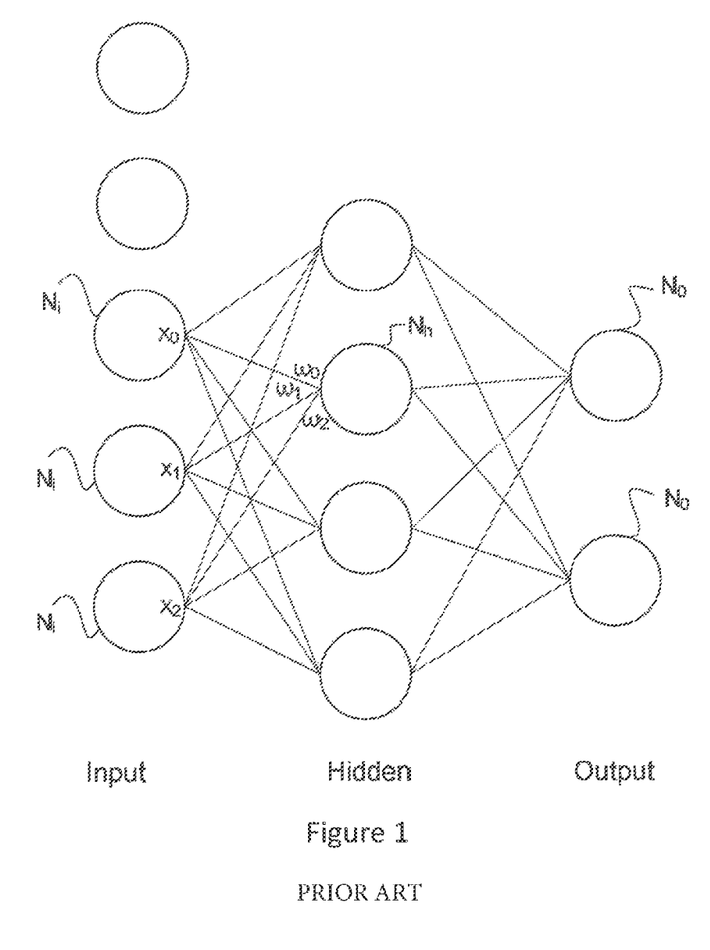
FIG. 1 is a highly simplified schematic view of a neural net.
Figure 1A:
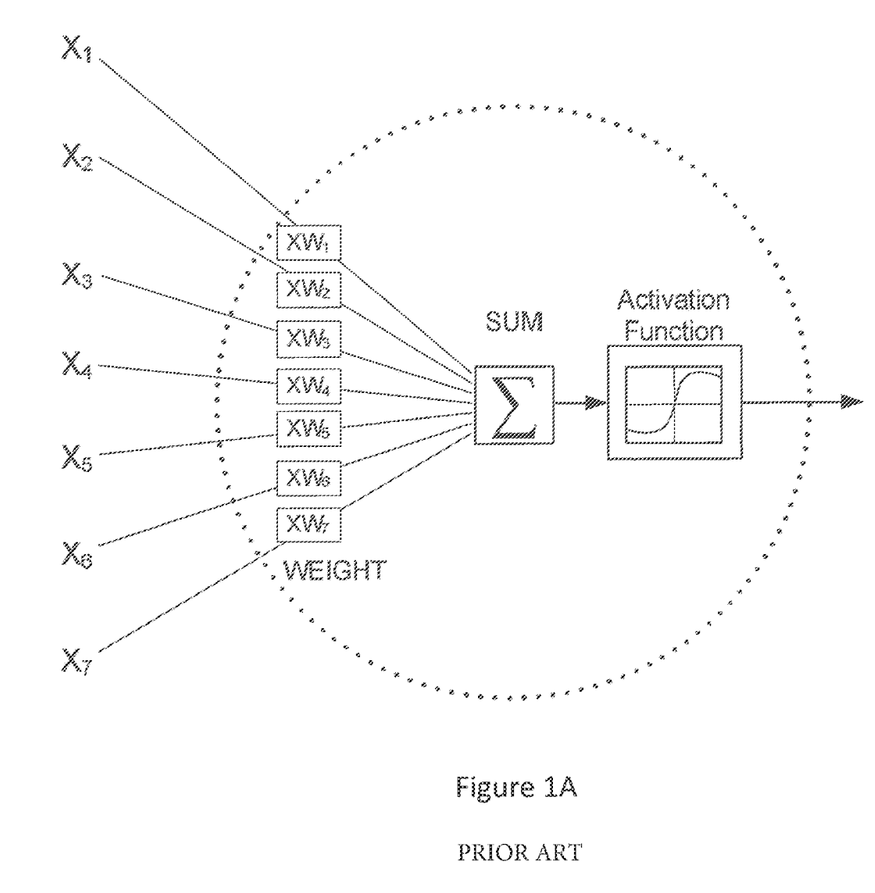
FIG. 1A is highly simplified schematic view of a neuron.

FIG. 1 shows an extremely simplified version of one arrangement of nodes in a neural network. This type of arrangement is often used in learning or training and comprises an input layer of nodes, a hidden layer of nodes and an output layer of nodes. In reality, there will be many nodes in each layer, and nowadays there may be more than one layer per section. Each node of the input layer Ni is capable of producing at its output an activation or node value which is generated by carrying out a function on data provided to that node. A vector of node values from the input layer is scaled by a vector of respective weights at the input of each node in the hidden layer, each weight defining the connectivity of that particular node with its connected node in the hidden layer. In practice, networks may have millions of nodes and be connected multi-dimensionally, so the vector is more often a tensor. The weights applied at the inputs of the node Nh are labelled w0 . . . w2. Each node in the input layer is connected at least initially to each node in the hidden layer. Each node in the hidden layer can perform an activation function on the data which is provided to them and can generate similarly an output vector which is supplied to each of the nodes $N_O$ in the output layer $N_O$. Each node weights its incoming data, for example by carrying out the dot product of the input activations of the node and its unique weights for the respective incoming links. It then performs an activation function on the weighted data. The activation function can be for example a sigmoid. See FIG. 1A. The network learns by operating on data input at the input layer, assigning weights to the activations from each node and acting on the data input to each node in the hidden layer (by weighing it and performing the activation function). Thus, the nodes in the hidden layer operate on the weighted data and supply outputs to the nodes in the output layer. Nodes of the output layer may also assign weights. Each weight is characterised by a respective error value. Moreover, each node may be associated with an error condition. The error condition at each node gives a measure of whether the error in the weight of the node falls below a certain level or degree of acceptability. There are different learning approaches, but in each case there is a forward propagation through the network from left to right in FIG. 1, a calculation of overall error, and a backward propagation from right to left in FIG. 1 through the network of the error. In the next cycle, each node takes into account the back propagated error and produces a revised set of weights. In this way, the network can be trained to perform its desired operation.

Certain calculations involving the use of floating point numbers may be carried out by a processing unit executing software instructions. Such calculations include the calculation of known functions, such as hyperbolic functions or logistic functions. These function may be quite complex to calculate.

A problem with which this present application is concerned is how to determine values for such functions, in such a way as to make efficient use of processing resources, such that values can be determined quickly and accurately.

SUMMARY

A particular problem is that complex functions behave differently in different ranges of the input variable, which means that different calculation approaches need to be adopted depending on the value of the input variable.

Specifically: when constrained by a "real" physical implementation, with limited internal precision, to implement a complex function in a processor, the different methods of approximating these complex functions have differing accuracy over different parts of the input range. In the worst cases, some approximations can produce no accurate bits in the result for parts of the input range.

According to a first aspect of the invention, there is provided an execution unit configured to determine a value of a function at an input value which is a floating point number, the execution unit comprising: a plurality of look up tables each comprising a plurality of entries, each of the entries comprising a value of the function in a particular range of input values; a correction table; a table selector configured to determine the particular range in which the input value falls and to select the look up table for that particular range; and an input buffer to receive an input floating point number comprising an input exponent and an input mantissa; wherein the execution unit is configured to use the selected look up table to determine an output floating point number for the input floating point number, to search the correction table using at least part of the input floating point number to determine if a correction value is held for that input floating unit number, and to apply the correction value to the output floating point number from the selected look up table to determine the value of the function.

At least part of the input mantissa may be used as an index to search the selected look up table when using the table to determine an output floating point number.

The table selector may use part or all of the input to determine a particular range to select the look up table from. There may be a plurality of look up tables from which the look up table is selected.

The execution unit may comprise interpolation circuitry, which searches the selected look up table using the input floating point number to select as least one entry from the first look up table. It may then perform interpolation in dependence upon the entry to determine the output floating point number of the selected look up table. At least part of the input mantissa may comprise a first set of bits of the input mantissa, and the interpolation may use a second set of bits of the input mantissa, which are different to the first set of bits, where the first set of bits are more significant than the second set of bits.

The selected look up table may store a plurality of differentials, each associated with one or more of the plurality of entries. The interpolation circuitry may use one of the differentials associated with the entry when performing the interpolation. The offset value between the input mantissa and the selected entry may be multiplied by the differential value associated with that entry. The correction value may be applied to the least significant bit(s) of the correction value to the truncated mantissa.

An output value of the function may be generated outside of the particular ranges. The spacing between entries of the plurality of entries in each table may be fixed. This fixed spacing varies in different tables in a manner which is inversely correlated with curvature of the function in the range for that table. The values of the function contained in each of the plurality of entries may be offset from true values for the function by an amount correlated with the curvature of the function.

According to a second aspect of the invention, there is provided a method for determining a value of a function at an input value which is a floating point number, the method comprising: determining the particular range in which the input value falls and selecting a look up table for that particular range; and receiving an input floating point number comprising an input exponent and an input mantissa; wherein the selected look up table is used to determine an output floating point number for the input floating point number, a correction table is searched using at least part of the input floating point number to determine if a correction value is held for that input floating unit number; and applying the correction value to the output floating point number from the selected look up table to determine the value of the function.

According to a third aspect of the invention, there is provided a computer program product comprising a computer program which comprises a computer program instruction recorded on a non-transitory media which when executed causes a hardware module to carry out a method as set out herein.

DETAILED DESCRIPTION

It is desirable to improve the accuracy of approximation of a complex function, even when constrained by a hardware functional unit. There are schemes (such as CORDIC) in which each iteration increases the accuracy of the result by another bit. The CORDIC algorithm may be implemented in hardware for calculating values of hyperbolic functions. However, algorithms such as CORDIC can be expensive to implement in hardware when fully pipelined (which is required for certain CPU architectures, such as multi-worker thread CPU architectures) or quite slow. Therefore, in many circumstances, implementing algorithms in hardware can be prohibitively slow or require a high degree of internal complexity.

The approach described herein trades algorithmic complexity (by supporting multiple algorithms) to maintain a reasonable internal complexity and minimise execution time.

Embodiments of the application provide a hardware solution for approximating the values of functions using floating point numbers. The technique is implemented in an execution unit of a processor. The execution unit (or functional unit) comprises a set of look up tables and correction CAMs. A problem that has existed previously is that look up tables to approximate functions can be large and consume a significant amount of memory. The inventors have realised that by treating a function differently in different ranges of input values concise look up tables can be constructed which are small and do not consume significant memory. In fact, they can be implemented as synthesised logic. The execution unit is configured to receive an input floating point number as an input value to a function and to determine the range it lies in. In a certain range, a sub-range is used to select a look up table from the set. The execution unit uses the floating point number to denote an index onto the selected look up table to determine a value for the function.

Figure 2:
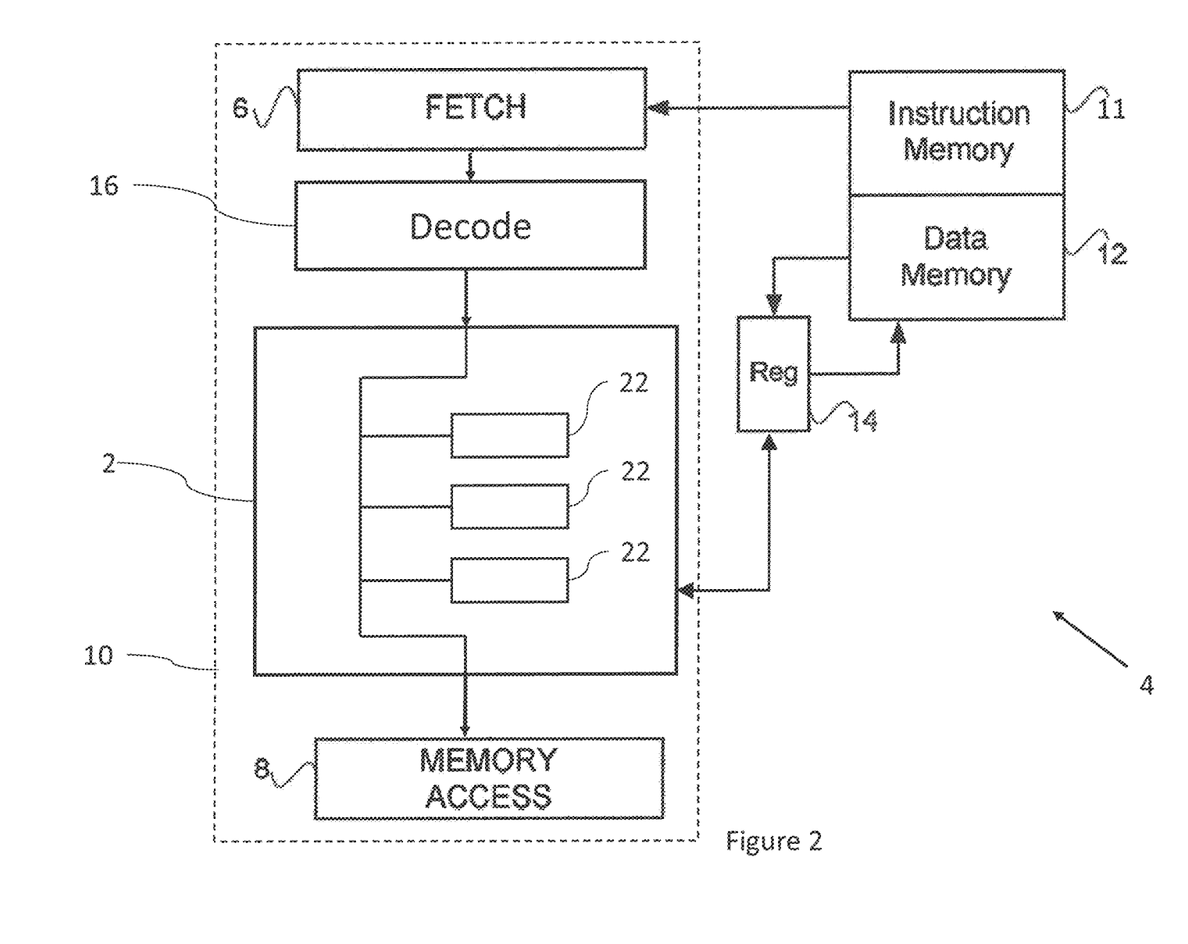
FIG. 2 illustrates a processing unit according to embodiments of the application.

Reference is made to FIG. 2, which illustrates an example of a processing module 4 in a data processing system or processor. The processing module 4 is part of a data processing system that may comprise a plurality of such processing modules 4. The processing module 4 includes a processing unit 10 having an execution unit 2 for executing instructions. Such instructions can include instructions to calculate the values of functions, e.g. y=f(x), where x is an operand in the instruction, y is the desired result, and f denotes the function. Examples of functions which can efficiently be handled by the techniques described herein include $f(x)=\tan h(x)$, $f(x)=$logistic function$(x)$ and $f(x)=$logarithmic function. Other functions may also be approximated using these techniques, such as exponentials trigonometric functions (sine/cosine/tangent), reciprocal ($1/x$) etc.

The execution unit 2 forms part of a pipeline of the processing unit 10. The processing unit 10 also comprises an instruction fetch stage 6 which fetches instructions from an instruction memory 11. The fetched instructions are passed to the decode stage 16 to be decoded, and the decode stage 16 then passes an indication of the decoded instruction to the execution unit 2 along with the decoded addresses of any operand registers specified in the instruction, in order for the instruction to be executed. The execution unit 2 has access to operand registers and control registers, which it may use in executing the instruction based on the decoded register addresses, such as in the case of an arithmetic instruction (e.g. by adding, multiplying, subtracting or dividing the values in two operand registers and outputting the result to another operand register of the respective thread) or a function instruction as described herein. Or if the instruction defines a memory access (load or store), the load/store logic of the execution unit 2 loads a value from the data memory 12 into an operand register of the respective thread, or stores a value from an operand register of the respective thread into the data memory 12, in accordance with the instruction.

The processing unit 10 comprises a memory access stage 8, which is responsible for accessing a data memory 12, for loading data from the memory 12, or storing data into the memory 12. A set of registers 14 is provided for holding source and destination operands for the instructions being executed at any instance by the pipeline of the processing unit 10. It will readily be understood that the pipeline may contain many different types of execution unit 2 for executing a variety of different instructions, for example for performing mathematical operations. One type of processing unit 10 which may be useful with the present invention is a processing unit 10 using barrel-threaded time slots, in which a supervisor thread may allocate different worker threads to different time slots for their execution.

The execution unit 2 may comprise a pipeline structure with a plurality of execution pipeline stages 22 for executing operations specified by the instructions fetched from instruction memory 10. The appropriate pipeline stage(s) for executing the instruction may be selected in dependence upon the decoding of the instruction performed at the decode stage 16. The execution unit described herein is configured to perform one or more operations for approximating the value of a function (e.g. $y=\tan h(x)$). In response to the execution by the execution unit 2 of an instruction for determining the value of a function, the execution unit 2 is configured to take a floating point number (the operand of the instruction) and the pipeline stages 22 perform said one or more operations to determine the value of the function. The execution unit 2 then provides the value as a result to the memory access stage 8 of the pipeline, which is configured to provide the approximated value of the function to the data memory 12 for storage.

The input floating point number comprises an exponent and a mantissa. In principle, techniques detailed herein may be adapted for full precision numbers, but in practice the main benefits are derived when the input floating point number is a half-precision floating point number (f16). The execution unit 2 is configured to receive the floating point number and use it to determine the range of the function that the input variable (x) lies in. A first look up table is selected from a plurality of look up tables based on the range. Each look up table has a range of entries comprising a plurality of mantissa values and, for each mantissa value, a corresponding value of the function. The processing unit 10 is configured to search the range of entries in the selected look up table using at least part (i.e. one or more bits) of the input mantissa (i.e. the mantissa of the input floating point number) as an index into the table to determine a value f(x) for the function. The number of bits depends upon the size of the lookup table. In one implementation, there is always more than 2 entries per table, so more than one bit is used but in the limit, it could be a single bit.

In the case that the input mantissa matches the mantissa of one of the table entries, the execution unit 2 is configured to select that entry in the table to determine the value of the function.

In the case that the input mantissa falls between two of the values of the plurality of mantissa values in the range of entries, the execution unit 2 is configured to apply interpolation to determine an output value. The look up table comprises differential values (Diffs) for the interpolation. Each of the differential values is associated with at least one of the entries in the table. The execution unit 2 is configured to determine, using interpolation, an output value in dependence on: the difference between the mantissa value which is output and the input mantissa; and the differential value stored in the table for at least one of those entries. The interpolation used may be linear interpolation.

The look up tables have different properties. For example the spacing between entries may be different for different look up tables. This reflects the fact that there may be different levels of curvature in different ranges of the function. A greater curvature may render the results from the interpolation at those points less accurate than the results from the interpolation at points of lesser curvature. In order to compensate for this, there may be a greater density of table entries at those parts of the input range for which the function has greater curvature than those parts of the input range for which the function has less curvature. In other words, the spacing (i.e. difference between the mantissa values of adjacent entries) between table entries may inversely correlate with the curvature of the function. This enables the interpolation to produce more accurate results. For this reason, each look up table may be associated with a particular sub-range of input values.

In some embodiments, the spacing between entries is fixed within each lookup table, although it may vary between look up tables. In other embodiments, the spacing may vary within the look up table. An extra field may be provided to denote the spacing between each adjacent pair of entries.

Figure 7:
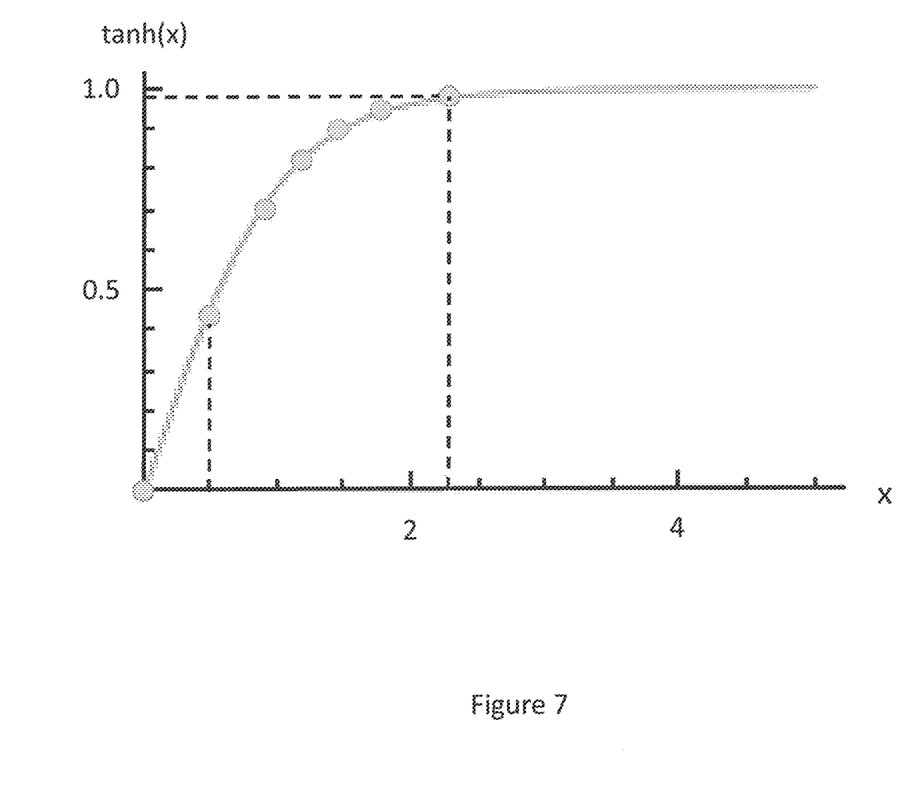
FIG. 7 illustrates an example tan h function and corresponding table entries.

In some embodiments, the look up table and correction table technique described above may only be applied within certain input ranges. In other input ranges, values for the function may be determined by calculating values of other functions which are approximations for those input ranges. The functions may be approximated using other functions, including constant values, over certain input ranges. For example, the function f(x)=tan h(x) (shown in FIG. 7) can be determined using the following as approximation functions within the indicated following ranges:

$$\tan h(x)=x,\ 0\leq |x|<2^{-5}$$

$$\tan h(x)=\pm 1.0,\ x>4$$

Look up tables and interpolation will be used for other values.

Similarly, the function f(x)=logistic(x) can be determined using the following as approximation functions within the indicated following ranges:

$$\text{logistic}(x)=0,\ x<-16$$

$$\text{logistic}(x)=e^x,\ -16<x<-4$$

$$\text{logistic}(x)=0.5,\ -2^{-10}<x<2^{10}$$

$$\text{logistic}(x)=1,\ x>6$$

Other functions (as outlined earlier) may similarly be divided into different ranges.

The execution unit 2 is configured to determine a value for the function using the look up table and correction table in response to determining that the input floating point number is within a first set of one or more input ranges. The execution unit 2 is configured to instead determine a value for the function using an approximation function if the input floating point number is within a second set of one or more input ranges.

Figure 3:
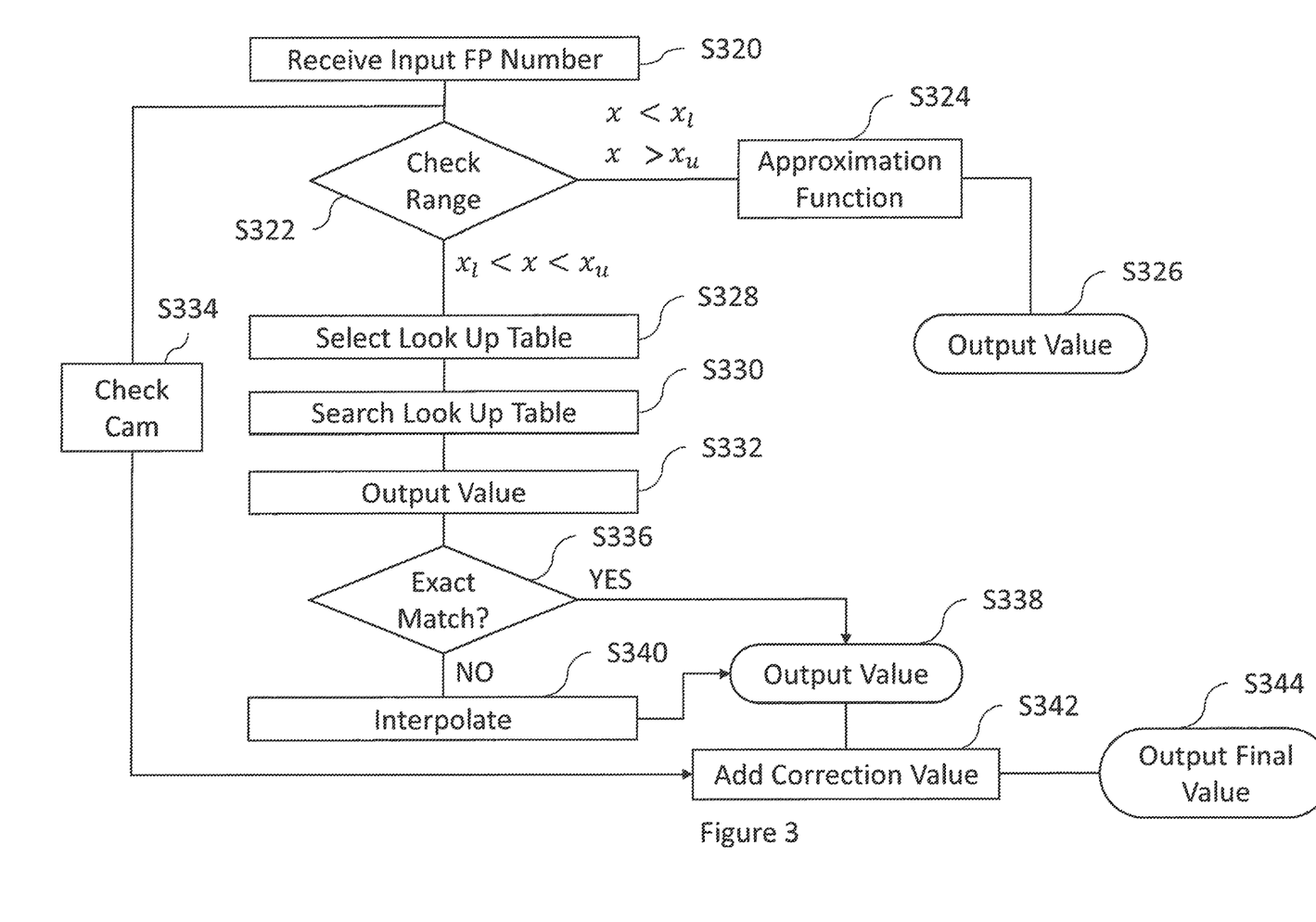
FIG. 3 is a flow chart illustrating the use of look up table and correction table to produce an approximation of a function.

Reference will now be made to FIG. 3 to describe the sequence carried out by the execution unit. At step S320 an input floating input number is received. This may be accessed from the memory and provided to the execution unit as an operand held in an input buffer of the execution unit. At step S322 the range within which the input number falls is checked to see whether it lies in a range where an approximation function can be used, or whether look up tables will be needed. If an approximation function is needed, this is processed at step S324 and an output value delivered at step S326.

If the input floating point number is in a range where look up tables are required, an appropriate look up table is selected based on the subrange within which the input floating point number falls. This can be done by checking its exponent or creating an index. This is shown at step S328.

At step S330 that look up table is searched using the mantissa of the input floating point number, or part of the mantissa to select an output value of the function. This value is output at step S332. In parallel, a bit sequence from the input floating point number (which could be all or part of the mantissa) is applied to the CAMs at step S334 to check whether or not a correction value exists for that input bit sequence. This is labelled step S334.

Reverting back to the main flow, it is determined at step S336 whether or not the output value is an exact match for the input mantissa. If it is, the function value is output at step S338. If it is not, an interpolation step is carried at step S340 and the interpolated value is supplied as the output value at step S338.

If a correction value has been looked up from the CAM at step S334 it is added to the output value at step S342. Then, the final output value is provided at step S344.

Reference is made to FIG. 7, which illustrates the use of difference spacing for a function in an input range where look up tables might be used. FIG. 7 shows the function f(x)=tan h(x), for values of 0<x<5. FIG. 7 shows a series of blue dots representing entries in the look up table in the range 0.5<x<2.25. As shown, the spacing between the entries along the input range is lower at parts of the range where the function has greater curvature (x>1) and greater at parts of the range function where lower curvature has (0.5<x<1). FIG. 7 illustrates this principle, however, in practice there are likely to be a greater number of entries used in the look up tables for calculating a value of this function than are shown in the Figure.

In order to produce more accurate results from the interpolated values determined from the look up table, the output values stored for the entries may be offset from the true values for the function. This may compensate for the error introduced by the curvature into the results of the interpolation. For example, for entries at which the curvature is positive, the output values of the entries may be positively offset from the true values of the function. For entries at which the curvature is negative, the output values of the entries may be negatively offset from the true values of the function. This increases the accuracy of the results from the interpolation. This is described later with reference to FIG. 8.

Performing the offsets to compensate for the curvature in the function may also lead to inaccuracies at other parts of the input range into the table. For instance, although the accuracy of interpolation between two points may be improved, the offsets may mean that when a matching entry is located in the table for a particular floating point mantissa, the output value that is read out from the table deviates from the true value for the function due to the offset introduced. Therefore, in order to address this, predefined corrections are stored in one or more content addressable memory (CAM). The inventors have noticed that a bit sequence derived from the mantissa can be used to search the correction table to determine a correction value, which is added to the mantissa of the look up table output. For the look up tables, part of the mantissa forms an index. For the CAMs, the entries in the CAM are inspected to see if any of the values contained in the CAM are equal to the entire input bit-field (i.e. the fp16 number is treated as a 16-bit integer). All of the CAM entries are inspected in parallel and if any of them is exactly equal to the input a hit is returned with the corresponding correction value that is stored alongside the matching value. In the case of a miss, we return a default correction (always 0 in the present embodiment is returned, but other default correction values are possible). This allows a very sparsely populated table to be stored as efficiently as possible—instead of $2^{16}$ entries, where most have the same value, only a few 10s (up to ~100) entries are needed for the results that aren't the default. The trade-off is number of comparators needed to check for hits—as long as the number of entries is small enough, this is still efficient. The correction value may comprise a single bit that is added to the least significant bit (LSB) of the mantissa of the look up table output.

Figure 6:
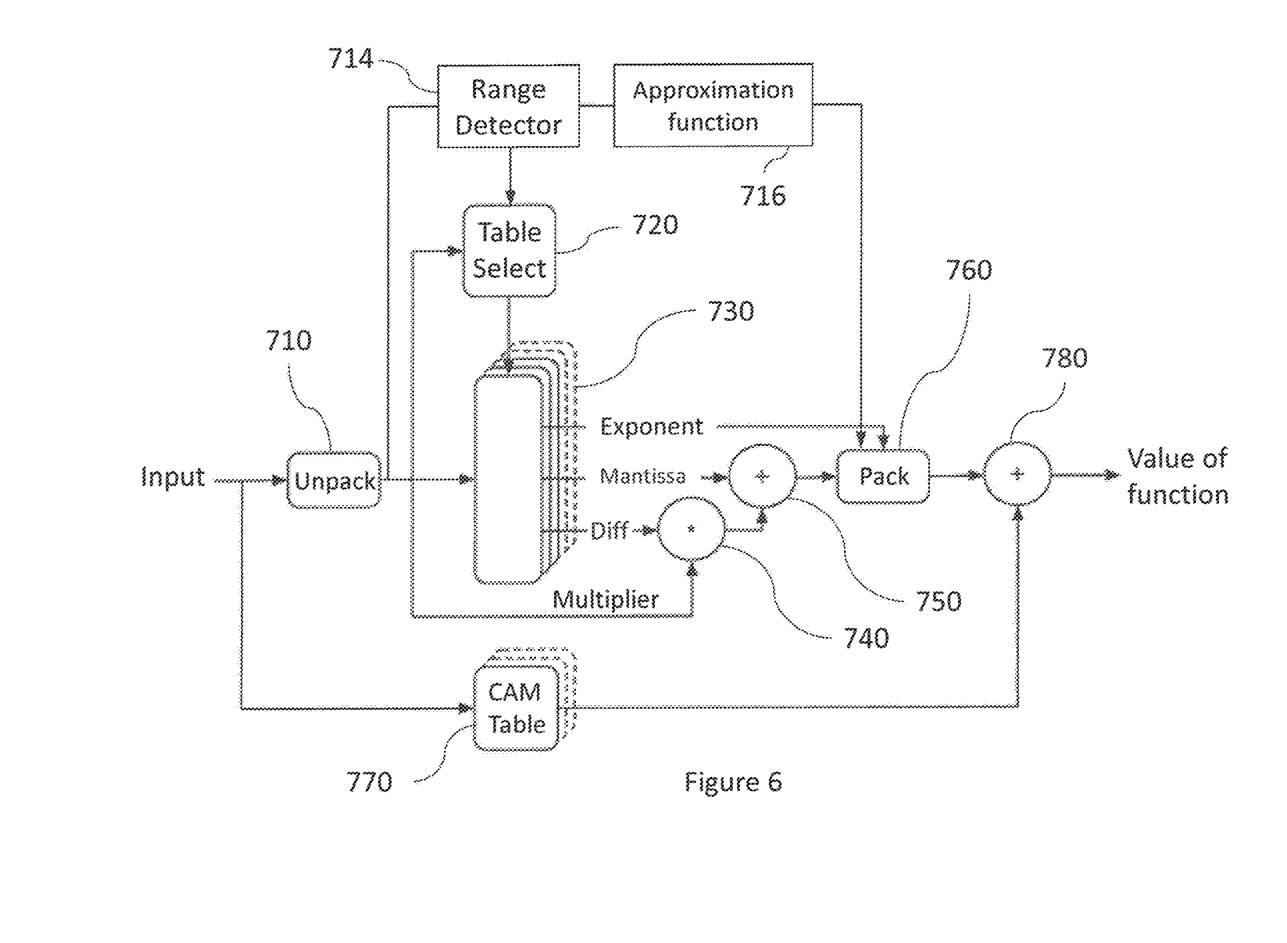
FIG. 6 illustrates the components of an execution unit for determining a value for a function.

Reference is made to FIG. 6, which illustrates the components of an execution unit for approximating a function according to embodiments of the application. The execution unit 2 is configured to hold in synthesised logic, a plurality of look up tables 730 and a correction table 770. The correction table 770 is implemented as one or more content addressable memories which enables high speed searching of the entries in the table. The CAMs are much smaller than the look up tables and are expected to hold a much lower number of entries, perhaps from 1 to four entries.

An index is formed from a bit selection from the mantissa of the input. The range of the floating point number is determined either using the exponent (e.g. in tan h(x)) or using a range check on the index (e.g. in log). Either an approximation function unit is chosen, or a look up table is selected based on the subrange. At least part of the bit sequence representing the mantissa is also used as in input into the correction table 770 to obtain a correction value. The correction value is added to the end of the mantissa of value obtained as the look up table output so as to produce a result that represents the value of the function. This result is an approximation of the particular function at the input value x represented by the input floating point number. At many input values, it may be the true value of the function. The function could be a hyperbolic function, such as tan h ( ). The function could be a logistic function.

Figure 4:
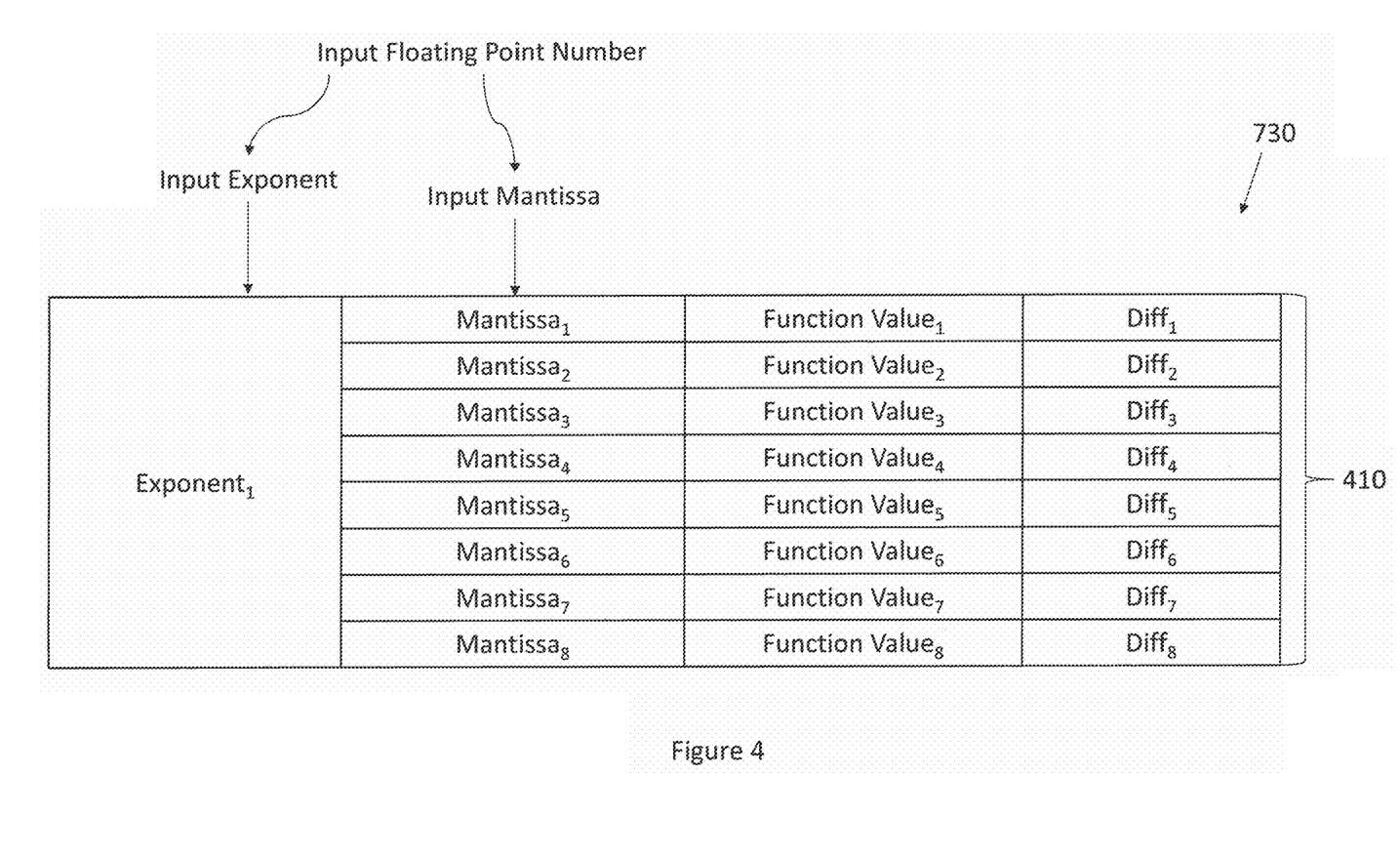
FIG. 4 is a simplified schematic of a flow look up table.

Reference is made to FIG. 4, which illustrates part of a look up table 730 in more detail. The look up table 730 comprises a plurality of entries, each entry comprising a separate function value (shown as Function values$_{1-8}$). Each function value comprises a sign bit, exponent and mantissa representing a value of the function. Each of the function values may be referenced by a unique combination of exponent (e.g. Exponent$_1$ shown in the table) and mantissa (any of Mantissa$_{1-8}$ shown in the table).

The entries 410 shown in the look up table 730 are associated with a particular sign bit. The entries shown may be entries corresponding to a sign bit of '1' or a sign bit of '0'. The execution unit may select a particular part of the look up table in dependence upon the sign bit, and then select an entry from this selected part.

As explained, the input exponent (or index) may select a particular look up table. In some embodiments, the input exponent of the input floating point number (or index in the case of log functions) is used to select the look up table. This may be done by determining a match between the input exponent and the exponent (i.e. Exponent$_1$) stored in the table. Alternatively, an index can be created from the mantissa and used to select an appropriate look up table.

In one embodiment, the whole input value is used. IEEE FP formats have a property that if the packed number is treated as an integer they are still numerically sorted with respect to each other. So it is possible to use the bit representation of a floating point number directly in a comparison to see if the input falls within a predefined range. The table selector uses a set of comparators to see whether the input (or some sub-field of the input) falls within different ranges and if it does, selects the matching table.

Subsequently, the execution unit is configured to use the input mantissa of the input floating point number to search the entries in the selected table to select at least one entry. For example, in response to selecting the table 730 in FIG. 4, the execution unit is configured to search the mantissas$_{1-8}$ for a match.

If a match between the input mantissa and one of the mantissas stored in the selected table cannot be found, the execution unit is configured to select at least one of the entries that are adjacent to one another and comprise mantissas between which the input mantissa falls. For example, if the input mantissa has a value falling between the mantissa$_2$ and mantissa$_3$, at least one of the entries comprising these mantissa are selected from the look up table 730. The execution unit may be configured to select the entry having a mantissa that is closest to the input mantissa.

To select an entry from the table, the execution unit may use only some of the bits of the input mantissa. The execution unit may use a first number of the most significant bits (MSBs) of the input mantissa to select an entry and then use the remaining bits of the input mantissa to perform interpolation.

The execution unit uses a selected entry from the look up table and applies interpolation to determine a result.

The Function Values shown in the table represents a value (which may be an approximate value) of the function for the particular sign bit, exponent and mantissa associated with an entry. For example if the function is a tan h function, the Function Value selected from the table represents a value for tan h for the particular sign bit, exponent and mantissa associated with the corresponding entry.

For linear interpolation, the multiplier calculates $$\left(\frac{o}{n}\right) \times d$$

where:
o=the offset from the index used to lookup (input mantissa−table-mantissa)
n=number of steps between indexes (entries)
d=differential value The diff value itself is in the table but the multiplier contains a hidden 1/n constant (usually this is a power-of-2 so is a simple shift rather than constant multiplication). This produces a linear step from the function value at the index used to the next function value at the next index.

Thus, the output value of the look up table may be determined as in equation 1 below:

$$\text{Output Value} = \frac{(\text{Input Mantissa} - \text{Table Mantissa}) * \text{Diff}}{n} + \text{Function Value}$$

where the Table Mantissa is the quantised version of the input mantissa used to index the look up table 730, and the Function Value is the function value in the entry that was selected during the search of the look up table 730.

Since the gradient of the function may vary over the function, the differential value that is to perform the interpolation varies for different input values of the function. The different values are stored in the look up table 730. Each Diff value is associated with one or more entries in the table. In the example shown in FIG. 4, each entry comprises a value of the differential, i.e. Diffs$_{1-8}$. The value of the differential that is stored for the selected entry is used to calculate the output value of the function.

Figure 5:
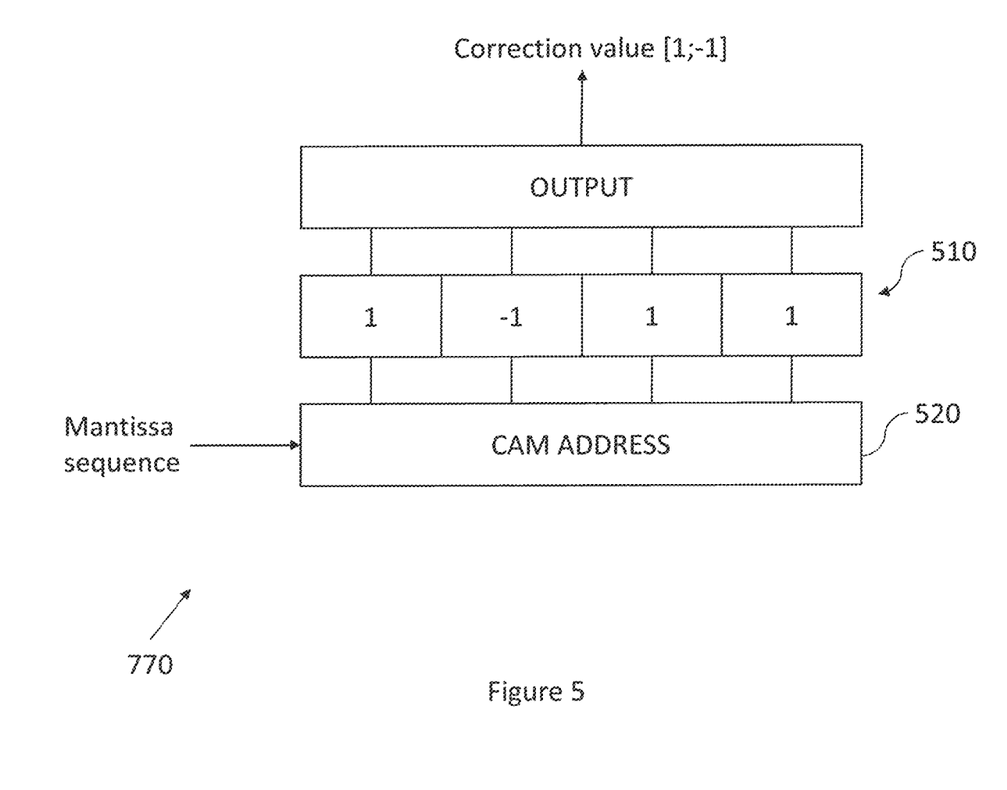
FIG. 5 is a simplified schematic of a correction table.

Reference is made to FIG. 5, which illustrates an example of a CAM of the correction table 770 according to examples of the application. The CAM comprises a number of correction values 510, addressable by a bit sequence from the mantissa, via a CAM addressing block 520. The execution unit is configured to use the mantissa bits to search the CAM 770 for an entry having a matching bit sequence. In response to a match being found, the corresponding correction value for that bit sequence is output.

As shown in FIG. 6, the correction value that is read out of the table 770 is added to the LSB of the mantissa of the look up table output to obtain a final result for the value of the function.

Figure 8:
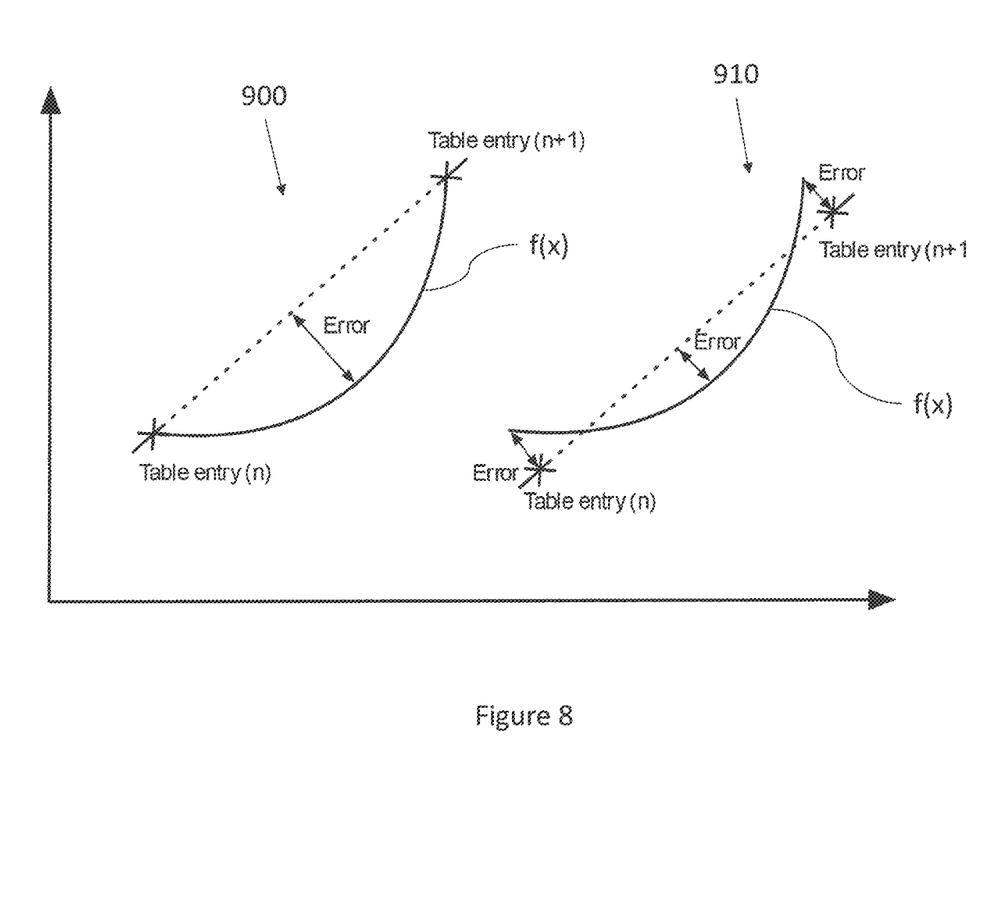
FIG. 8 illustrates examples of the use of offsets in the table entries to reduce absolute error.

Reference is made to FIG. 8, which illustrates how the values for the function stored in the look up table are offset from the true values for the function f(x) so as to reduce the absolute error in the results. FIG. 8 shows a first example 900 in which no offsets are introduced in the look up table values.

For the first example 900, the table entries comprise the true values of the function f(x). In this case, since the curvature of the function 910 is quite high, if the input floating point number falls in the middle of the two table entries, when the linear interpolation is carried, the error from the true function f(x) is larger than in the case of the second example 910.

In the second example, the table entries comprise values for the function f(x) that are offset from the true values f(x). Although, this introduces some error in the entries themselves, the error in the interpolation may be reduced. Overall, the absolute error may be reduced using this technique.

In order to compensate for the offsets to the function values in the look up table, the correction table is used to adjust one or more bits of the output floating point number from the look up table.

Reference is made again to FIG. 6, which illustrates in more detail the steps performed by the execution unit for determining the value of a function. The blocks shown in FIG. 6 represent hardware configured to perform certain functions, responsive to computer readable instructions which have supplied one or more operand as an input value. The input floating point number is provided to an unpack block 710 that is configured to split the input floating point number into separate sign, exponent, and mantissa fields. The unpack block 710 is also configured to unbias the exponent so as to make the exponent suitable for use in searching look up tables. The unpack block 710 additionally expands the field bit widths to the greater width used by an internal representation used by the look up tables. For example, the unpack block expands the field width of the mantissa, e.g. to a field width of greater than the 10 bits used to represent the mantissa in the half-precision floating point format. A range detector 714 determines if the input value is in a range where an approximation function 716 might be applied or where look up tables are needed.

Block 720 is a table selector configured to select a first look up table from the plurality of look up tables 730 in dependence upon the input exponent (or an index from the mantissa). In response to the input exponent being determined to lie in a sub-range, the block 720 is configured to select from the plurality of look up tables the look up table with exponents in that subrange. The block 720 also selects the table using the sign bit of the input floating point number.

The execution unit is configured to search the first look up table using the input mantissa to select at least one entry. If the execution unit finds a mantissa matching the input mantissa in the selected look up table, the execution unit selects the entry comprising that matching mantissa and outputs the matching mantissa and corresponding exponent and corresponding sign bit stored for that entry in the look up table.

If there is no matching entry, the entry that is output is the one before the next one that would be required (i.e. it is always lower than the desired match).

Figure 9:
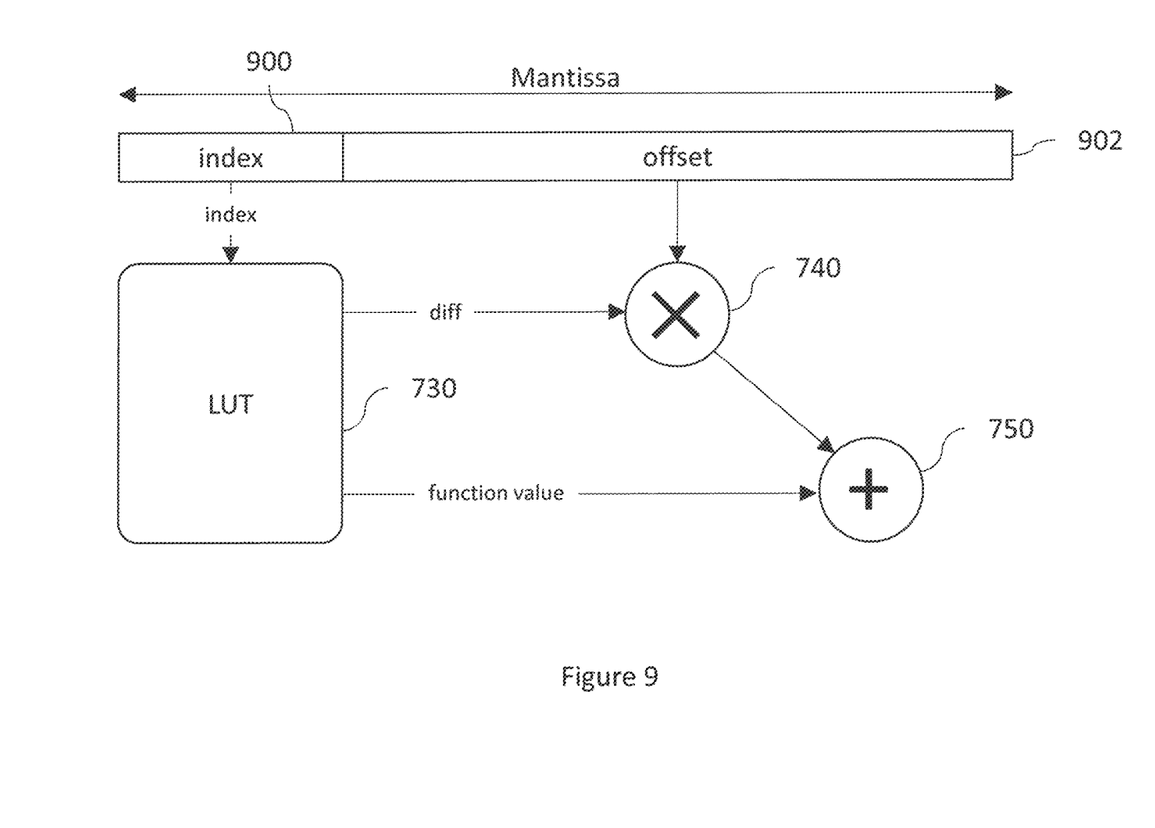
FIG. 9 shows interpolation in more detail.

FIG. 9 is a more detailed diagram explaining the interpolation process. At the top of the diagram the mantissa from the input value is shown split into index 900 and offset 902 fields. As explained, the index is used to access the selected look up table 730 to locate a matching entry, or the one before the one that would be required. The entry which is indexed has a function value as has been described. This function value is supplied to the adder 750. In addition, the Diff value is supplied to the multiplier 740 along with the offset 902. As already mentioned, there is an implied Diff division by n here, where n is the number of steps between the look up table entries (the SP facing). Due to splitting the mantissa into the index and offset fields, this can be implemented as a simple fixed bit shift of the result. The result of the multiplier 740 is supplied to the adder 750 to give the final result as the approximated function value.

As mentioned, the value which is returned from the look up table is always the one exactly at or before the one that would be required. The next value is found as value+Diff—so these two values straddle the result that would be returned if the table contained an entry for every incoming mantissa value. The multiplier/add stages interpolate along a straight line between the value that was looked up and the value which would have been next, according to the magnitude of the offset field.

Note that some look up table indexes start at non-zero values to allow consecutive tables to continuously cover the entire input range.

The execution unit may be configured to select the entry using a first set of bits of the input mantissa (these being the most significant bits of the input mantissa). The execution unit may select an entry from the table for which the first set of bits of the input mantissa match corresponding mantissa bits stored for an entry in the table. The execution unit may be configured to then output the remaining bits of the input mantissa as the diff value.

The Diff value from the look up table and the offset value from the mantissa are used to perform the interpolation. They are multiplied together at the multiplier block 740, and the result of this multiplication is added at the addition block 750 to the mantissa of the selected entry from the look up table.

At the pack block 760, the values of the exponent, mantissa and sign bit derived from the selected look up table (or the approximation function 716) are used to construct an output floating point number in the same format (e.g. half-precision format) as the input floating point number. The pack block 760 is configured to reduce the field bit-widths of the output mantissa and the output exponent to the widths used for the half-precision format. The pack block 760 is configured to truncate the exponent and bias it. The pack block 760 is configured to truncate the mantissa and round the LSB of the truncated mantissa. The pack block 760 is configured to then concatenate the output mantissa and the exponent and sign bit to produce the output floating point number.

The input floating point number is used as an input into the at least one correction table 770. The execution unit is configured to use some or all of the bits of the input floating point number as an index to search for matching entry from the at least one correction table 770. If no matching entry is found, then the correction value is taken to be zero. If a matching entry is found, the correction value stored for that matching entry is added to the least significant bit of the mantissa of the output floating point number at the addition block.

It will be appreciated that the embodiments described above are by way of non-limiting examples only, and that variations within the scope of the claims may be envisaged.

What is claimed is:

1. An execution unit configured to determine a value of a function, the execution unit comprising:
   a plurality of look up tables each comprising a plurality of entries, each of the entries comprising the value of the function in a particular input range;
   a correction table;
   a table selector configured to determine the particular input range in which an input floating point number falls and to select a look up table of the plurality of look up tables for a respective particular input range;
   an input buffer to receive the input floating point number comprising an input exponent and an input mantissa; and
   an interpolation circuitry configured to:
      search the selected look up table using the input floating point number to select at least one entry of the plurality of entries from the selected look up table; and
      perform interpolation in dependence upon the selected at least one entry to determine an output floating point number of the selected look up table for the input floating point number,
      wherein the execution unit is configured to:
         search the correction table using at least part of the input floating point number to determine if a correction value is held for a respective input floating point number; and
         apply the correction value to the output floating point number from the selected look up table to determine the value of the function;
      wherein the selected look up table stores a plurality of differentials, each associated with one or more of the plurality of entries of the selected look up table; and
      wherein the interpolation circuitry is configured to perform the interpolation using one of said plurality of differentials that is associated with the selected at least one entry.

2. An execution unit as claimed in claim 1, wherein using the selected look up table to determine the output floating point number for the input floating point number comprises using at least part of the input mantissa as an index to search the selected look up table.

3. An execution unit as claimed in claim 1, wherein the table selector is configured to use the input exponent to determine the particular input range to select the look up table from the plurality of look up tables.

4. An execution unit as claimed in claim 2, wherein the table selector is configured to use the index to select the look up table from the plurality of look up tables.

5. An execution unit as claimed in claim 2, wherein:
   the at least part of the input mantissa comprises a first set of bits of the input mantissa;
   performing the interpolation comprises using a second set of bits of the input mantissa different from the first set of bits of the input mantissa; and
   the first set of bits are higher order bits than the second set of bits.

6. An execution unit claimed in claim 1, further comprising a multiplier configured to multiply an offset value between the input mantissa and the selected at least one entry by the one of said plurality of differential values associated with the selected at least one entry.

7. An execution unit as claimed in claim 1, further configured to apply the correction value to a least significant bit of a truncated version of an output mantissa of the output floating point number.

8. An execution unit as claimed in claim 1, wherein: a spacing between entries of the plurality of entries in each table is fixed, the fixed spacing varying in different tables in a manner which is inversely correlated with curvature of the function in the particular input range for a respective table.

9. An execution unit as claimed in claim 1, wherein the value of the function contained in each of the plurality of entries is offset from a true value of the function by an amount correlated with curvature of the function.

10. A method performed by an execution unit for determining a value of a function, the method comprising:
    receiving, at an input buffer, an input floating point number comprising an input exponent and an input mantissa;
    determining, by a table selector, a particular input range in which the input floating point number falls;
    selecting, by the table selector, a look up table for a respective particular input range;
    searching, by an interpolation circuitry, the selected look up table using the input floating point number to select at least one entry of a plurality of entries from the selected look up table;
    performing, by the interpolation circuitry, interpolation in dependence upon the selected at least one entry to determine an output floating point number of the selected look up table for the input floating point number;
    searching, by the execution unit, a correction table using at least part of the input floating point number to determine if a correction value is held for a respective input floating point number; and
    applying, by the execution unit, the correction value to the output floating point number from the selected look up table to determine the value of the function,
    wherein the selected look up table stores a plurality of differentials, each associated with one or more of the plurality of entries of the selected look up table;
    wherein the interpolation circuitry is configured to perform the interpolation using one of said plurality of differentials that is associated with the selected at least one entry; and
    wherein the execution unit comprises: a plurality of look up tables each comprising the plurality of entries, each of the entries comprising the value of the function in the particular input range; the correction table; the table selector; the input buffer; and the interpolation circuitry.

11. A method according to claim 10, wherein the selected look up table is used to determine the output floating point number for the input floating point number using at least part of the input mantissa as an index to search the selected look up table.

12. A method according to claim 10, wherein the input exponent is used, by the table selector, to determine the particular input range to select the look up table from the plurality of look up tables.

13. A method according to claim 11, wherein the index is used, by the table selector, to select the look up table from the plurality of look up tables.

14. A method according to claim 10, wherein the correction value is applied to a least significant bit of a truncated version of an output mantissa of the output floating point number.

15. A method according to claim 10, further comprising multiplying, via a multiplier, an offset value between the input mantissa and the selected at least one entry by the one of said plurality of differential values associated with the selected at least one entry.

16. A method according to claim 10, wherein a spacing between entries of the plurality of entries in each table is fixed, the fixed spacing varying in different tables in a manner which is inversely correlated with curvature of the function in the particular input range for a respective table.

17. A method according to claim 16, wherein the value of the function contained in each of the plurality of entries is offset from a true value of the function by an amount correlated with the curvature of the function in the particular input range for the respective table.

18. A non-transitory computer readable medium storing computer program instructions which when executed cause a method for determining a value of a function, the method comprising:

receiving, at an input buffer, an input floating point number comprising an input exponent and an input mantissa;

determining, by a table selector, a particular input range in which the input floating point number falls;

selecting, by the table selector, a look up table for a respective particular input range;

searching, by an interpolation circuitry, the selected look up table using the input floating point number to select at least one entry of a plurality of entries from the selected look up table;

performing, by the interpolation circuitry, interpolation in dependence upon the selected at least one entry to determine an output floating point number of the selected look up table for the input floating point number;

searching, by an execution unit, a correction table using at least part of the input floating point number to determine if a correction value is held for a respective input floating point number; and applying, by the execution unit, the correction value to the output floating point number from the selected look up table to determine the value of the function, wherein the selected look up table stores a plurality of differentials, each associated with one or more of the plurality of entries of the selected look up table;

wherein the interpolation circuitry is configured to perform the interpolation using one of said plurality of differentials that is associated with the selected at least one entry; and wherein the method is carried out by the execution unit comprising: a plurality of look up tables each comprising the plurality of entries, each of the entries comprising the value of the function in the particular input range; the correction table; the table selector; the input buffer; and the interpolation circuitry.

* * * * *